United States Patent
Kamata

(10) Patent No.: US 10,780,805 B2
(45) Date of Patent: Sep. 22, 2020

(54) VEHICLE SEAT

(71) Applicant: TACHI-S CO., LTD., Akishima-shi, Tokyo (JP)

(72) Inventor: Hideki Kamata, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 94 days.

(21) Appl. No.: 16/151,331

(22) Filed: Oct. 3, 2018

(65) Prior Publication Data

US 2019/0111814 A1    Apr. 18, 2019

(30) Foreign Application Priority Data

Oct. 12, 2017    (JP) .................................. 2017-198137

(51) Int. Cl.
*B60N 2/58*    (2006.01)

(52) U.S. Cl.
CPC ......... *B60N 2/5875* (2013.01); *B60N 2/5883* (2013.01)

(58) Field of Classification Search
CPC ............................ B60N 2/5875; B60N 2/5883
USPC ..................................................... 297/452.61
See application file for complete search history.

(56) References Cited

U.S. PATENT DOCUMENTS

| 4,765,045 A | * | 8/1988 | Selbert | ................. | B60N 2/5875 |
| | | | | | 156/267 |
| 5,290,093 A | * | 3/1994 | Crayne | .................... | A47C 7/18 |
| | | | | | 297/452.61 X |
| 2018/0001807 A1 | | 1/2018 | Kamata et al. | | |

FOREIGN PATENT DOCUMENTS

JP    2016-129645 A    7/2016

* cited by examiner

*Primary Examiner* — Anthony D Barfield
(74) *Attorney, Agent, or Firm* — SGPatents PLLC

(57) ABSTRACT

An objective is to provide a vehicle seat that ensures a reduced effect on an appearance even when a sewn portion made by sewing the trim cover is bonded in a groove. A vehicle seat formed by bonding a trim cover to a foam pad is configured such that the trim cover includes a sewn portion made by sewing a plurality of skin materials, the foam pad has a groove, the vehicle seat is formed by the sewn portion of the trim cover and the sewn portion is bonded in the groove of the foam pad, and the groove includes a guiding portion that guides a seam allowance of the sewn portion to the groove, and a restricting portion that restricts the seam allowance of the sewn portion to support the seam allowance of the sewn portion in a state where the seam allowance of the sewn portion does not open.

10 Claims, 2 Drawing Sheets

VEHICLE SEAT

BACKGROUND

The present invention relates to a vehicle seat, in particular, a vehicle seat formed by bonding a skin material to a foam pad.

Among vehicle seats, there is a vehicle seat formed by bonding a skin material to a foam pad molded into a substantially seat outer shape.

As a related art in this technical field, for example, there is JP-A-2016-129645. JP-A-2016-129645 discloses a method for manufacturing a vehicle seat including a mold pad and a trim cover that covers the mold pad. JP-A-2016-129645 discloses that the mold pad has a groove, an adhesive is applied into the groove, the trim cover is pushed into the groove, a steam nozzle is inserted into the mold pad from a surface of the mold pad opposite from a surface covered by the trim cover, and heat or steam from the steam nozzle melts the adhesive in the groove so as to bond the trim cover to the groove.

JP-A-2016-129645 provides a vehicle seat that has an excellent texture on a contact surface and ensures a facilitated manufacturing process and a method for manufacturing the vehicle seat.

However, when a sewn portion made by sewing the trim cover is bonded in the groove, in what shape a seam allowance made by sewing the trim cover is bonded in the groove is not considered, and therefore, there has been a possibility of an appearance is affected by the seam allowance being bonded in a standing state in some cases.

The present invention has been made in consideration of these problems, and an objective is to provide a vehicle seat that ensures a reduced effect on an appearance even when a sewn portion made by sewing the trim cover is bonded in a groove.

SUMMARY OF THE INVENTION

The present invention considers the above-described related art and problems, and one of the examples includes a vehicle seat formed by bonding a trim cover to a foam pad. The trim cover includes a sewn portion made by sewing a plurality of skin materials. The foam pad has a groove. The vehicle seat is formed by the sewn portion of the trim cover. The sewn portion is bonded in the groove of the foam pad. The groove includes a guiding portion and a restricting portion. The guiding portion guides a seam allowance of the sewn portion to the groove. The restricting portion restricts the seam allowance of the sewn portion to support the seam allowance of the sewn portion in a state where the seam allowance of the sewn portion does not open.

Advantageous Effects of Invention

With the present invention, a vehicle seat that ensures a reduced effect on an appearance can be provided even when a sewn portion made by sewing the trim cover is bonded in a groove.

DETAILED DESCRIPTION OF THE PREFERRED EMBODIMENTS

The following describes an embodiment of the present invention with reference to the drawings.

Embodiment

Figure 3:
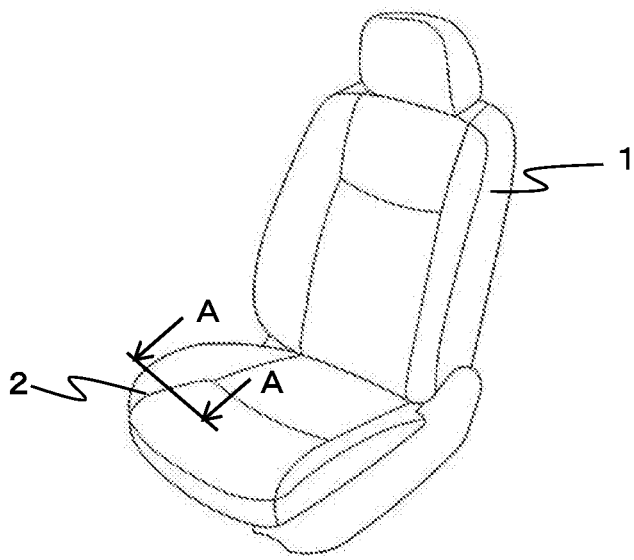
FIG. 3 is an external view of a conventional vehicle seat.

First, an appearance of a vehicle seat that is a prerequisite for the embodiment will be described with reference to FIG. 3. FIG. 3 is an external view of the vehicle seat that is the prerequisite for the embodiment. The vehicle seat includes a seat back (backrest portion) and a seat cushion (seat portion). The seat back and the seat cushion have surfaces covered with a trim cover 1 made by sewing a seat-shaped cover. A design groove 2 formed on a top surface of the seat cushion is for improving designability.

Figure 4:
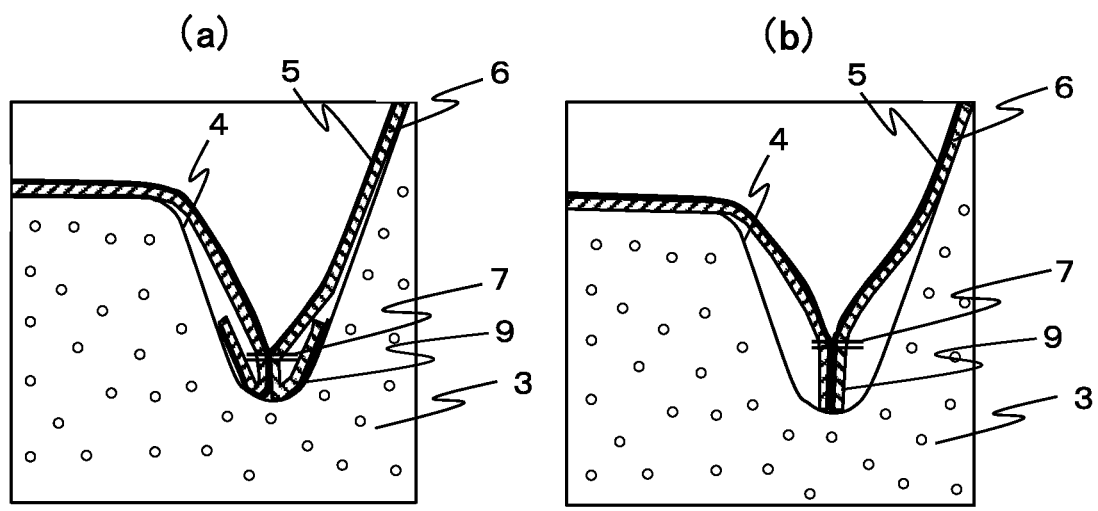
FIG. 4 is a schematic diagram of a cross-sectional surface taken along A-A in FIG. 3.

FIG. 4 illustrate a cross-sectional view taken along a side A-A in FIG. 3. In FIG. 4, the trim cover 1 includes a mold pad 3, a groove 4, a skin material 5, and a wadding 6. The mold pad 3 is a molded foam pad. The groove 4 is disposed in the mold pad 3 for constituting the design groove 2. The wadding 6 is made of, for example, urethane. The skin material 5 and the wadding 6 configure the trim cover 1. The trim cover includes a plurality of skin materials and waddings connected together, and its sewn portion 7 is illustrated. Although it is not illustrated, an adhesive is applied in the groove 4. The sewn portion 7 of the trim cover 1 pushed into the groove 4 is bonded in the groove 4 with the adhesive.

Here, FIG. 4(a) illustrates a case where a seam allowance 9 of the sewn portion is bonded in an opening state. Since the sewn portion 7 is pushed down to a bottom portion of the groove 4, the trim cover 1 is formed along the groove 4, and there is no effect of the sewn portion 7 on an appearance. In contrast to this, FIG. 4(b) illustrates a case where the seam allowance 9 of the sewn portion is bonded in a standing state. In the case of a skin material having rigidity, such as an artificial leather and a real leather, the seam allowance of the sewn portion does not open, and thus, the seam allowance 9 falls into the standing state. Therefore, the sewn portion 7 is not pushed down to the bottom portion of the groove 4 to cause many portions of the trim cover 1 to fail to follow the groove 4; therefore, the sewn portion 7 possibly affects the appearance. In the case where the sewn portion 7 is excessively pushed in in this state squashes the seam allowance 9, and thus, a variation occurs in a squashed direction. This possibly affects the appearance.

Therefore, the following describes the embodiment to solve it.

Figure 1:
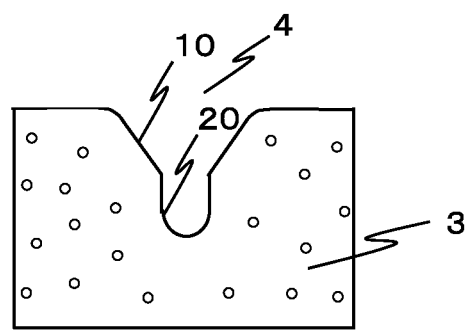
FIG. 1 illustrates a cross-sectional shape of a groove of a mold pad according to an embodiment.

FIG. 1 is a cross-sectional shape of a groove of a mold pad according the embodiment. As illustrated in FIG. 1, in the embodiment, a shape of the groove is made in a Y groove shape in contrast to a conventional V groove shape. That is, the groove 4 includes a guiding portion 10 and a restricting portion 20. The guiding portion 10 guides a seam allowance of a sewn portion into a groove portion. The restricting portion 20 restricts a movement of the seam allowance of the sewn portion so as to support the seam allowance of the sewn portion in a state where the seam allowance of the sewn portion does not open, that is, the standing state. That is, even when the seam allowance is disposed in the standing state, the restricting portion 20 is deeply dug down with respect to the guiding portion 10 by a length of the seam allowance such that the trim cover 1 covers the mold pad along the guiding portion 10. This ensures disposing the seam allowance of the sewn portion in the groove in a standing state without opening even in the case of the skin material having the rigidity, such as the artificial leather and the real leather, thereby ensuring the reduced effect of the sewn portion 7 on the appearance.

It should be noted that the seam allowance of the sewn portion is supported by the restricting portion 20 in the standing state, and therefore, a length for bonding the conventional seam allowance in the opening state is no longer necessary. While the artificial leather and the real leather with the rigidity stand even though the seam allowance is long, a cloth skin without rigidity, for example, shortens its seam allowance to 5 mm from a length of 8 mm of the conventional seam allowance in order to obtain rigidity in the seam allowance even just a little. This eliminates the necessity of changing the length of the restricting portion 20 in accordance with a material of the artificial leather, the real leather, the cloth skin, or the like, thereby ensuring a constant length. A usage of the skin material is reduced to improve a yield, and the short length ensures reduced variation in insertion into the restricting portion 20.

While in the abovementioned description, the shape of the groove is in the Y groove shape, the guiding portion 10 may be in a curved line or may be asymmetric, and thus, the shape may be changed in accordance with an appearance of the design groove. The restricting portion 20 is only necessary to support the seam allowance in the state where the seam allowance does not open, and therefore, the restricting portion 20 is not necessarily parallel to an insertion direction or in a linear shape.

Figure 2:
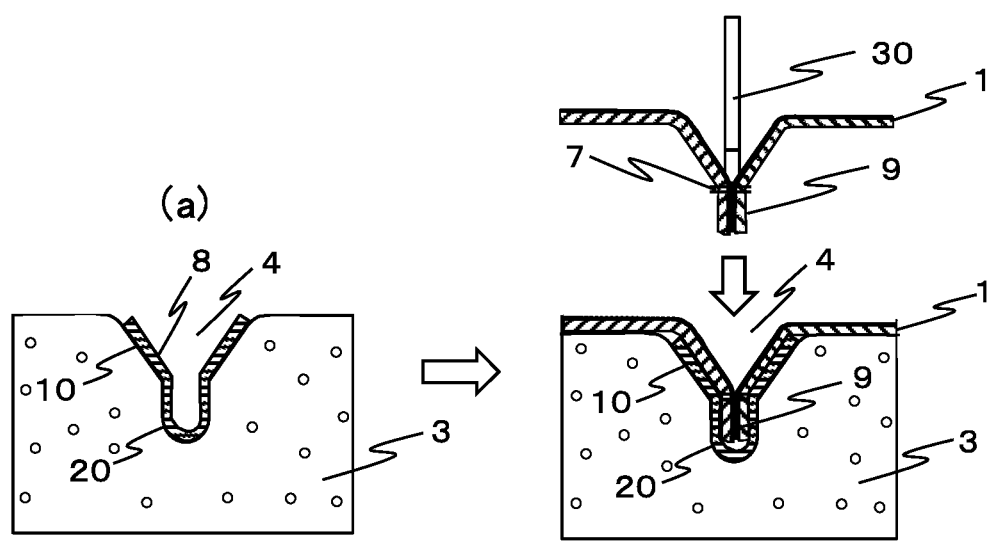
FIG. 2 is a drawing describing a method for bonding a trim cover to the groove according to the embodiment.

FIG. 2 is a drawing describing a method for bonding a trim cover to a groove according to the embodiment. First, in FIG. 2(a), an adhesive 8 is sprayed into the groove 4 of the mold pad 3. It should be noted that an application of an adhesive into a groove may use a method to pour a liquid adhesive into the groove or may use an adhesive of a type of dripping into the groove. Next, as illustrated in FIG. 2(b), the sewn portion 7 of the trim cover 1 is set onto a pushing plate 30. Then, the pushing plate 30 pushes the sewn portion 7 of the trim cover 1 into the groove 4 in which the adhesive of the mold pad 3 is attached to bond them.

Thus, with the embodiment, pushing the seam allowance of the sewn portion into the restricting portion 20 of the groove of the mold pad 3 in the standing state stabilizes the finish. The length of the seam allowance of the sewn portion can be shortened, and therefore, the usage of the skin material is reduced to lead to an improved yield.

It should be noted that, while the above-described description has been described by targeting the design groove formed on the seat cushion of the vehicle seat, it is apparent that it is applicable to a design groove formed on a seat back.

While the above-described description has been described that the trim cover includes the skin material and the wadding, this should not be construed in a limiting sense, for example, a skin material covering a mold pad may configure a trim cover.

While the embodiment has been described above, the present invention is not limited to the above-described embodiment but includes various modifications. The above-described embodiment has been described in detail in order to easily describe the present invention, and therefore, it is not necessarily limited to include all the described configurations. It is possible to replace a part of the configuration of the embodiment with another configuration.

REFERENCE SIGNS LIST 1 trim cover
2 design groove
3 mold pad
4 groove
5 skin material
6 wadding
7 sewn portion
8 adhesive
9 seam allowance
10 guiding portion
20 restricting portion
30 pushing plate

What is claimed is:

1. A vehicle seat formed by bonding a trim cover to a foam pad,
wherein the trim cover includes a sewn portion made by sewing a plurality of skin materials,
the foam pad has a pre-formed groove,
the sewn portion is bonded in the pre-formed groove of the foam pad, and
the groove includes a guiding portion and a restricting portion, the guiding portion guiding a seam allowance of the sewn portion to the restricting portion, the restricting portion being directly bonded to the seam allowance and restricting the seam allowance so as to support the seam allowance in a state where the seam allowance does not open.

2. The vehicle seat according to claim 1, wherein the restricting portion supports the seam allowance of the sewn portion in a standing state.

3. The vehicle seat according to claim 1, wherein a shape of the groove is in a Y groove shape.

4. A vehicle seat formed by bonding a sewn portion of a trim cover, made by sewing a plurality of skin materials, to a pre-formed groove in a foam pad, wherein the groove includes a guiding portion and a restricting portion, the guiding portion guiding a seam allowance of the sewn portion to the restricting portion, the restricting portion being bonded directly to the seam allowance and restricting the seam allowance so as to support the seam allowance in a state where the seam allowance does not open.

5. The vehicle seat according to claim 4, wherein the restricting portion supports the seam allowance of the sewn portion in a standing state.

6. The vehicle seat according to claim 4, wherein a shape of the groove is in a Y groove shape.

7. A vehicle seat formed by bonding a sewn portion of a trim cover, made by sewing a plurality of skin materials, to a pre-formed groove in a foam pad, wherein the pre-formed groove includes a guiding portion and a restricting portion, the guiding portion guiding a seam allowance of the sewn portion to the restricting portion, the restricting portion being dug down with respect to the guiding portion by a length of the seam allowance.

8. The vehicle seat according to claim 7, wherein the restricting portion supports the seam allowance of the sewn portion in a standing state.

9. The vehicle seat according to claim 7, wherein a shape of the groove is in a Y groove shape.

10. The vehicle seat according to claim 7, wherein a portion of the trim cover adjacent to the sewn portion is bonded directly to the guiding portion and the restricting portion is bonded directly to the seam allowance.

* * * * *